(12) United States Patent
Adriano et al.

(10) Patent No.: US 10,494,799 B2
(45) Date of Patent: Dec. 3, 2019

(54) UNIVERSAL HYDRAULIC CONNECTION SYSTEM

(71) Applicant: Verum Italy S.R.L., Seregno (IT)

(72) Inventors: Davide Adriano, Turin (IT); Gabriele Adriano, Turin (IT)

(73) Assignee: Verum Italy S.R.L. (IT)

( * ) Notice: Subject to any disclaimer, the term of this patent is extended or adjusted under 35 U.S.C. 154(b) by 0 days.

(21) Appl. No.: 15/759,271

(22) PCT Filed: Jul. 28, 2016

(86) PCT No.: PCT/IT2016/000185
§ 371 (c)(1),
(2) Date: Mar. 12, 2018

(87) PCT Pub. No.: WO2017/046823
PCT Pub. Date: Mar. 23, 2017

(65) Prior Publication Data
US 2018/0251965 A1    Sep. 6, 2018

(30) Foreign Application Priority Data

Sep. 17, 2015    (IT) .............................. UB2015A3702

(51) Int. Cl.
*E03C 1/06* (2006.01)
*E03C 1/04* (2006.01)
*F16L 3/00* (2006.01)
*F16L 3/12* (2006.01)

(52) U.S. Cl.
CPC ................. *E03C 1/06* (2013.01); *E03C 1/04* (2013.01); *E03C 1/0408* (2013.01); *F16L 3/003* (2013.01); *F16L 3/1218* (2013.01)

(58) Field of Classification Search
CPC ........................................................ E03C 1/06
USPC ............................................................ 4/676
See application file for complete search history.

(56) References Cited

U.S. PATENT DOCUMENTS

| 6,422,520 B1 | 7/2002 | Hand |
| 8,365,320 B1 | 2/2013 | Lordahl et al. |
| 2014/0261808 A1 | 9/2014 | Brouwer et al. |

FOREIGN PATENT DOCUMENTS

CN    2318488 Y    5/1999

*Primary Examiner* — Lori L Baker
(74) *Attorney, Agent, or Firm* — Boyle Fredrickson, SC

(57) ABSTRACT

A universal hydraulic connection system includes at least one control mixer (1) and interchangeable inlet connectors (2) and outlet connectors (3) for connecting to a hydraulic network. The universal hydraulic connection system also includes at least one supporting device (4) further comprising a quick connection system for a removable connection of the control mixer (1) to the supporting device (4) keeping a hydraulic connection of the control mixer (1) itself to the hydraulic network.

5 Claims, 13 Drawing Sheets

UNIVERSAL HYDRAULIC CONNECTION SYSTEM

BACKGROUND OF THE INVENTION

1) Field of the Invention

The present invention refers to a universal hydraulic connection system.

In particular, the present invention refers to a universal hydraulic connection system comprising a mixer which can be adapted both to the type of required fastening, such as a fixed wall, a piping, a shelf, etc. and to the type of user, such as a wash-basing, a tank, a shower, a vessel, a fountain, etc.

2) Background Art

Traditionally, metal or plastic mixers comprising quick connection systems of the inlet and outlet piping allow an adaptation with respect to piping with different diameter in order to connect taps of a certain user.

The state of the art of hydraulic mixers and taps of the universal type is given by several patents.

For example, Utility Model CN2318488Y discloses a universal water supplying valve comprising a water inlet pipe, a valve and an outlet pipe. The water discharge pipe is connected with a rigid undulated pipe. The water outlet angle of the universal water supplying valve can be changed at will.

Document U.S. Pat. No. 8,365,320B1 discloses a universal discharge valve system comprising a connector adapted to house different connections of different types of discharge valves.

Patent application US20140261808A1 discloses a universal valve body comprising a front face having a circular opening to receive a valve cartridge, a rear face, a frustum-of-cone shaped side wall connecting the front face to the rear face, a prima inlet opening and a first outlet opening arranged in the side wall.

Document U.S. Pat. No. 6,422,520B1 discloses universal assembling bracket configured for assembling mixer directly prepared in the rear part of a wall made of glass fibre of a shower. The assembling bracket is connected to a plurality of U-shaped clips which engage a plurality of rectangular openings placed on the bracket body. The assembling bracket comprises a plurality of forked rear projections. The configuration of the forked projections allows fastening a plurality of copper pipes of the mixing valve.

SUMMARY OF THE INVENTION

Object of the present invention is solving the above prior art problem, by providing a universal hydraulic connection system which allows removably connecting a control mixer to a supporting device, keeping the hydraulic connection of such control mixer with a hydraulic network.

Another object of the present invention is providing a universal hydraulic connection system which is simple to build, easy to manage as production and warehouse.

A further object is providing a universal hydraulic connection system which can be made through an extremely simple manufacturing process.

The above and other objects and advantages of the invention, as will appear from the following description, are obtained with a universal hydraulic connection system as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
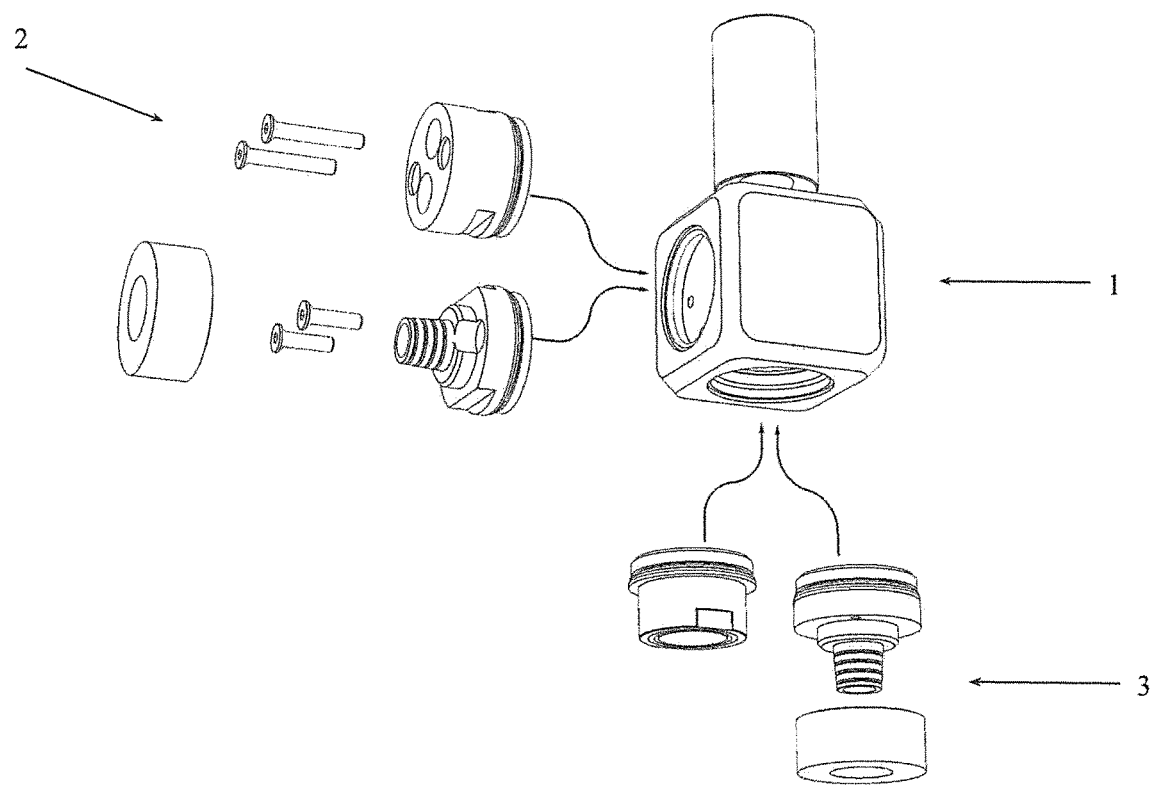
FIG. 1 shows an exploded perspective view of a "L" configuration of a control mixer connected to a hydraulic network, through interchangeable inlet and outlet connectors, of one embodiment of the universal hydraulic connection system according to the present invention.
Figure 2:
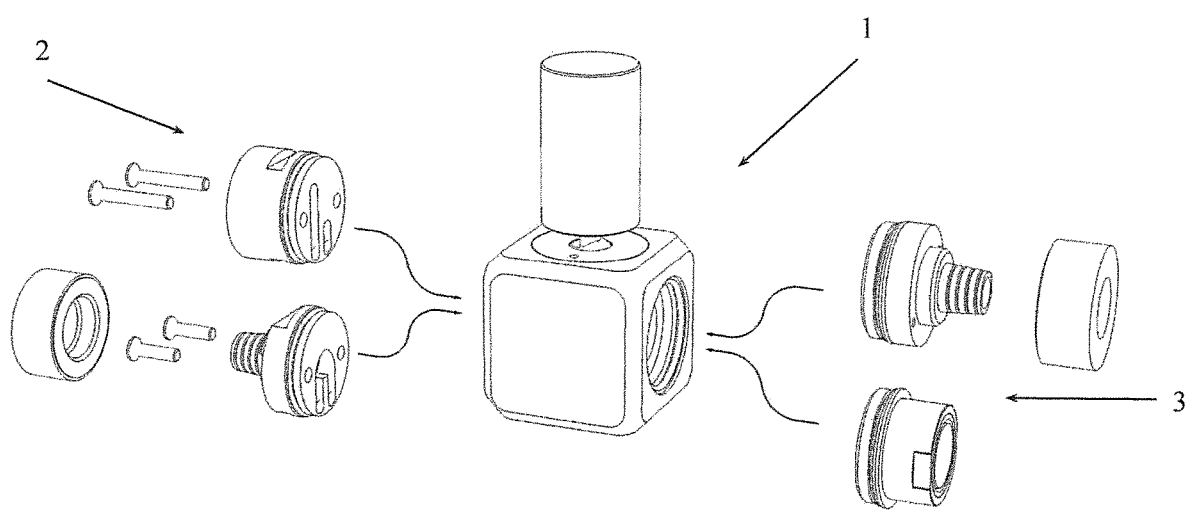
FIG. 2 shows an exploded perspective view of a straight configuration of a control mixer connected to a hydraulic network, through interchangeable inlet and outlet connectors, of one embodiment of the universal hydraulic connection system according to the present invention.
Figure 3:
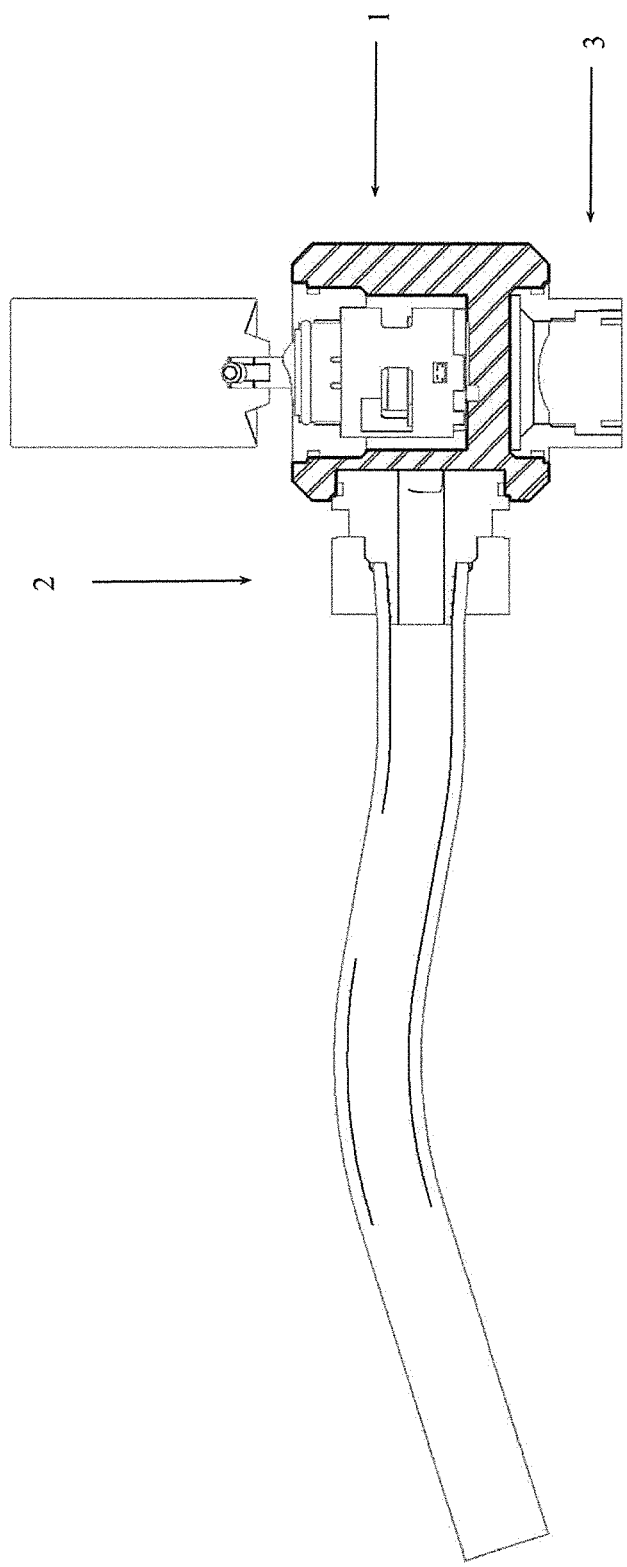
FIG. 3 shows a sectional view of the control mixer of FIG. 1.
Figure 4:
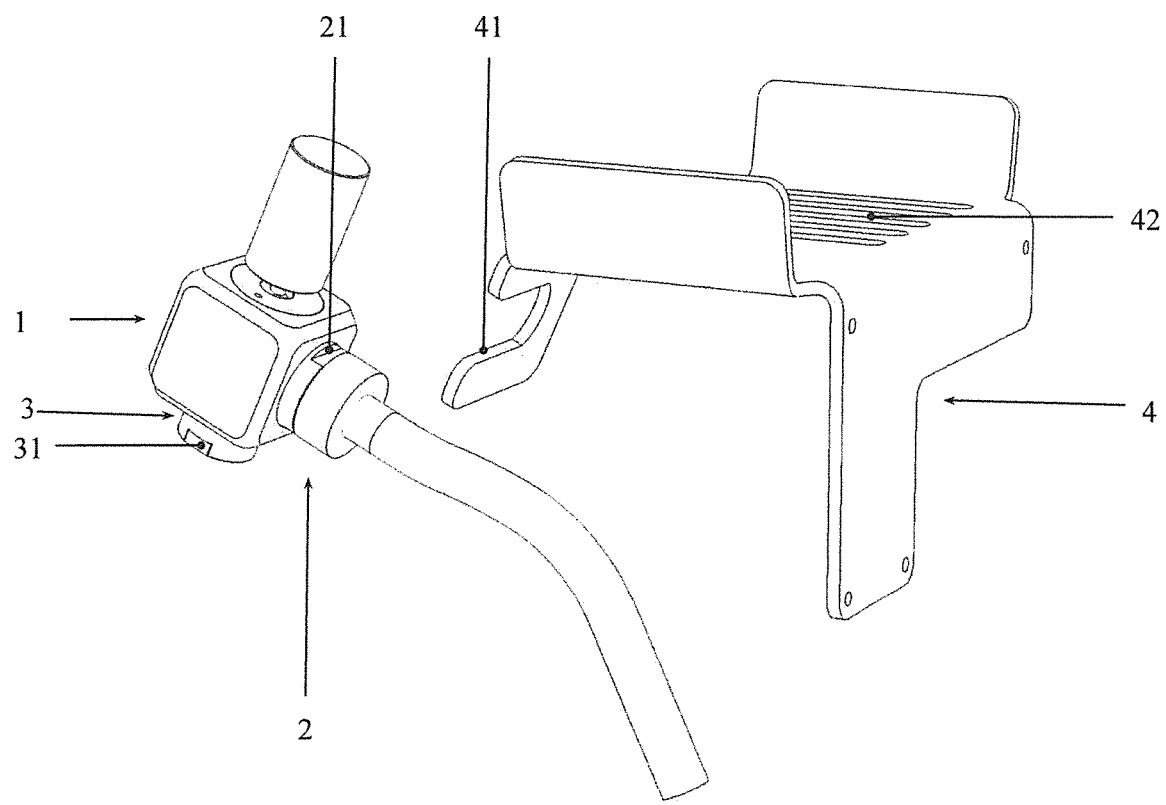
FIG. 4 shows a perspective view of a first embodiment of the universal hydraulic connection system according to the present invention in an assembling step.
Figure 5:
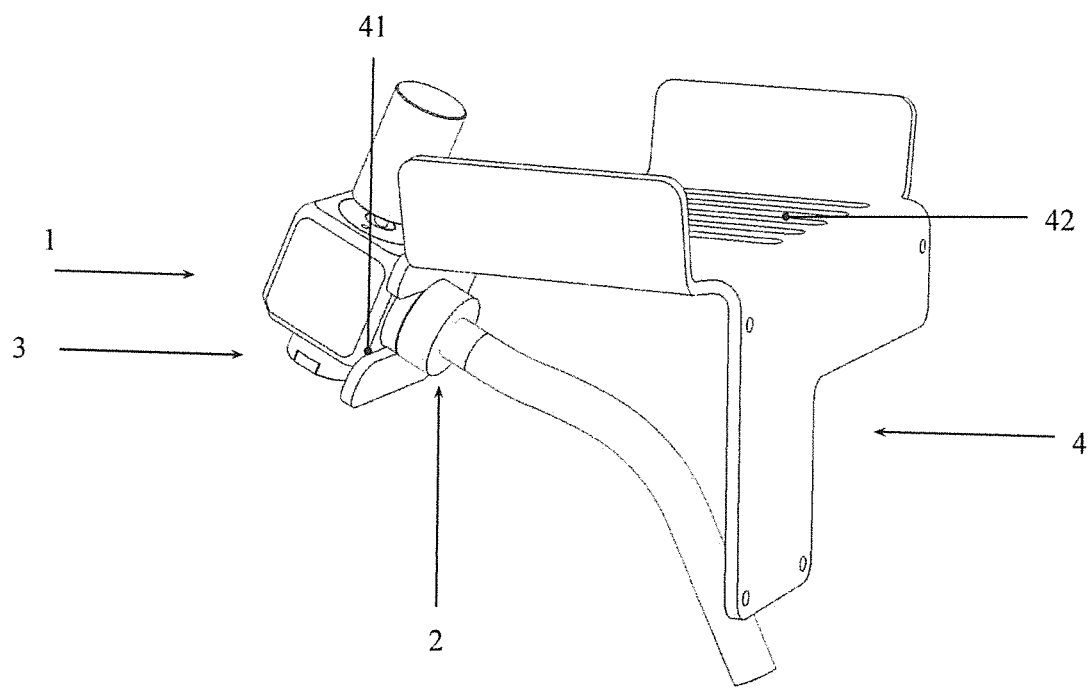
FIG. 5 shows a perspective view of the universal hydraulic connection system according to the present invention in a further assembling step.
Figure 6:
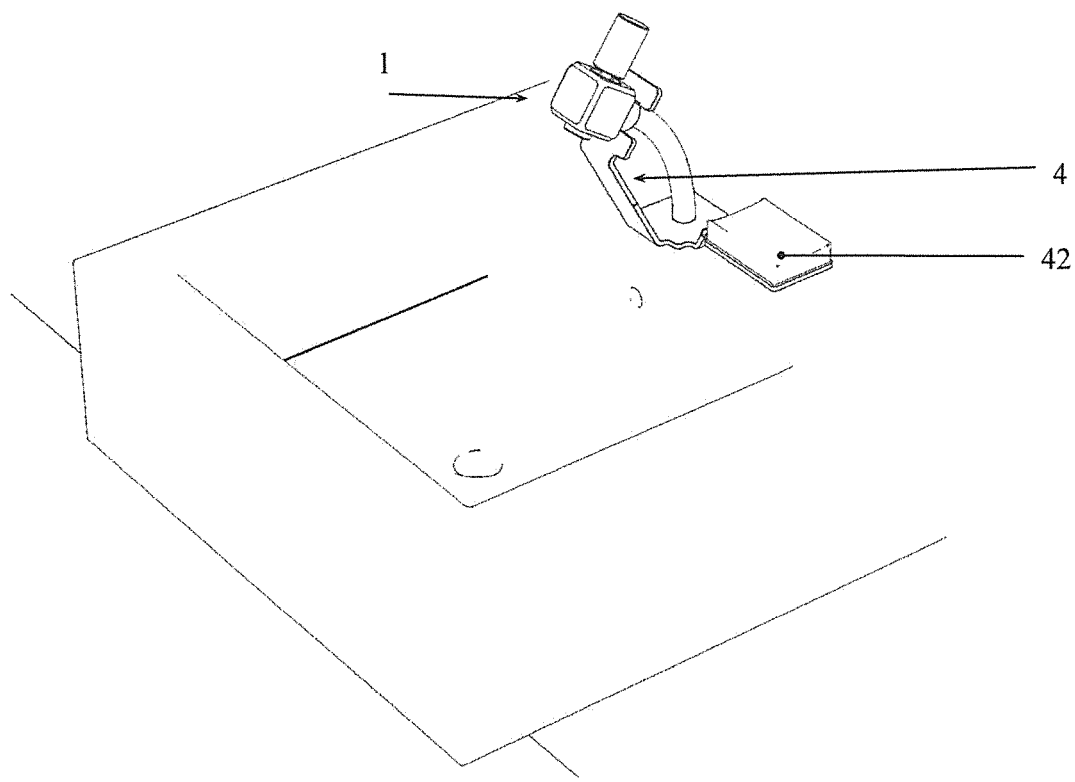
FIG. 6 shows a perspective view of another embodiment of the universal hydraulic connection system according to the present invention.
Figure 7:
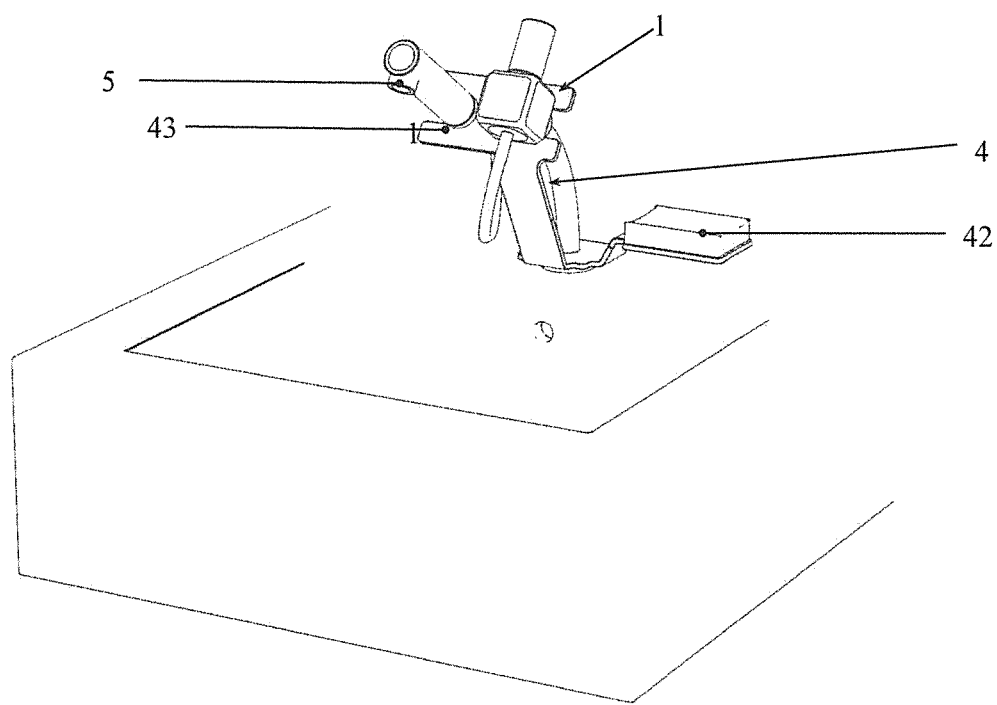
FIG. 7 shows a perspective view of another embodiment of the universal hydraulic connection system according to the present invention.
Figure 8:
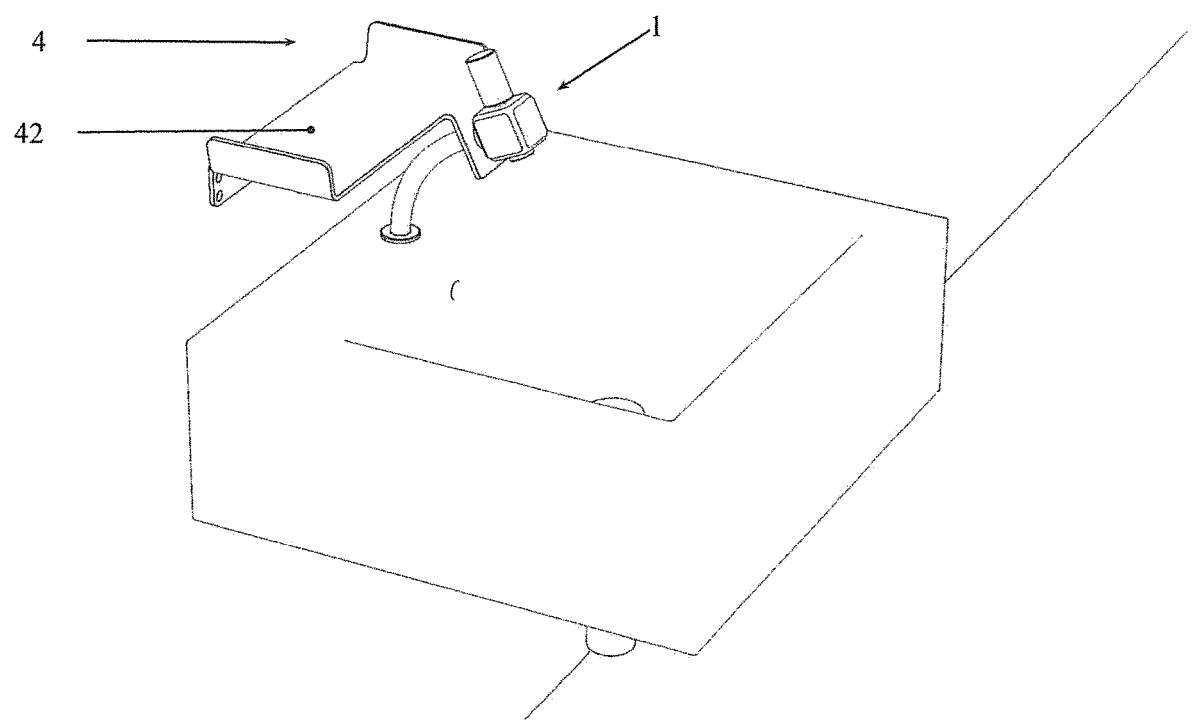
FIG. 8 shows a perspective view of another embodiment of the universal hydraulic connection system according to the present invention.
Figure 9:
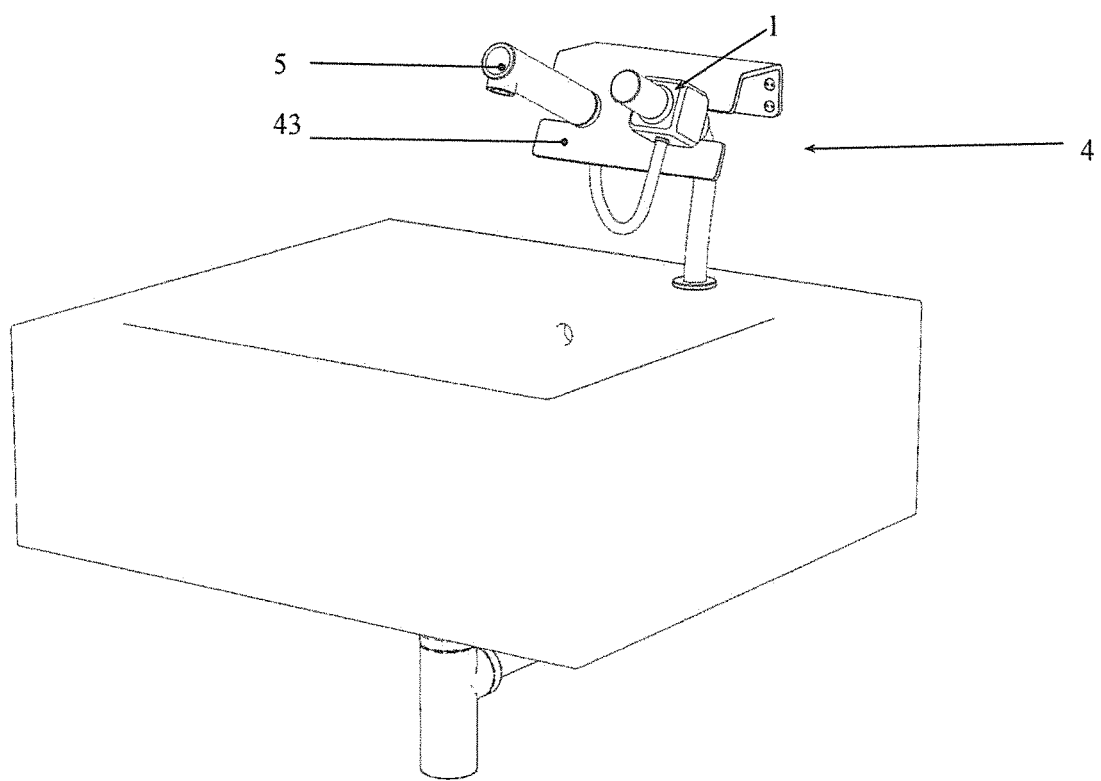
FIG. 9 shows a perspective view of another embodiment of the universal hydraulic connection system according to the present invention.

With reference to FIGS. 1 to 5, it is possible to note that universal hydraulic connection system according to the present invention comprises at least one control mixer 1, interchangeable inlet connectors 2 and outlet connectors 3 for a connection to a hydraulic network and at least one supporting device 4.

Moreover, the inlet connector 2 can be of the type with single entry (not shown, commonly for cold water only), or of the type with double entry (shown in FIG. 1, with an entry for cold water and one for hot water), in order to perform the function of mixer.

Advantageously, the system according to the present invention further comprises a quick connection system which allows removably connecting the control mixer 1 to the supporting device 4 though keeping the hydraulic connection of the control mixer 1 with respect to the hydraulic network.

In particular, the quick connection system is composed of a grooved profile 21, 31, of at least one of the interchangeable inlet connector 2 and outlet connector 3 and of a shaped guide 41 of such supporting device 4. In this way, the quick connection device allows sliding and blocking the control mixer 1 with respect to such supporting device 4.

With reference to FIGS. 4 to 8, it is possible to note that the supporting device 4 can comprise a shelf 42 to allow resting objects thereon.

With reference to FIGS. 9, 10, 13, 14, 17, 18 and 21, it is possible to note that the supporting device 4 can comprise a flange adapted to support at least a tap 5 hydraulically connected to the control mixer 1.

Figure 10:
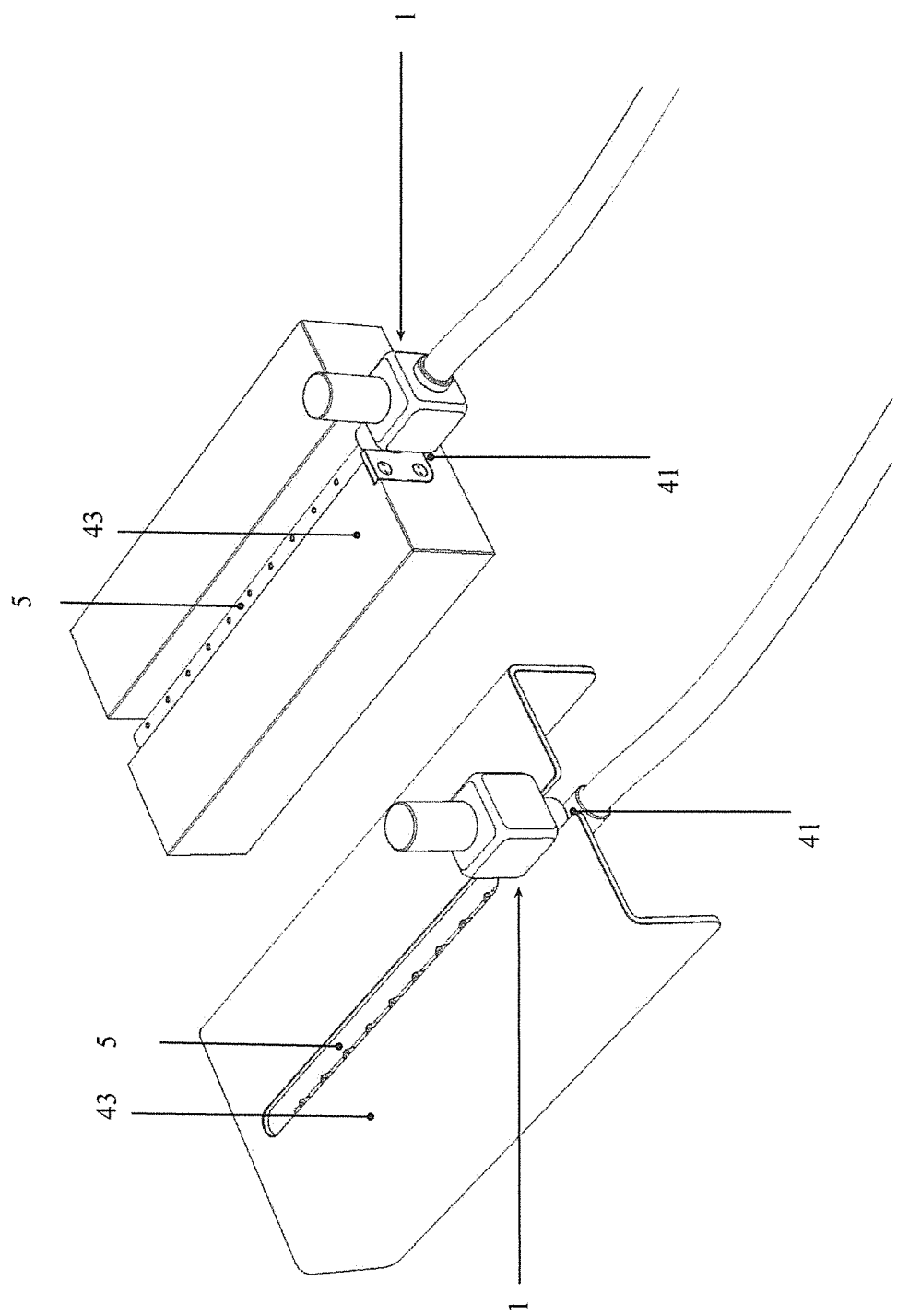
FIG. 10 shows a perspective view of another embodiment of the universal hydraulic connection system according to the present invention.

In particular, with reference to FIG. 10, it is possible to note that the flange 43 can be equipped with at least one longitudinal groove and the tap 5 can be of the type composed of a pipe equipped with a series of holes to allow addressing a jet of water through such groove obtained along such flange 43.

Figure 11:
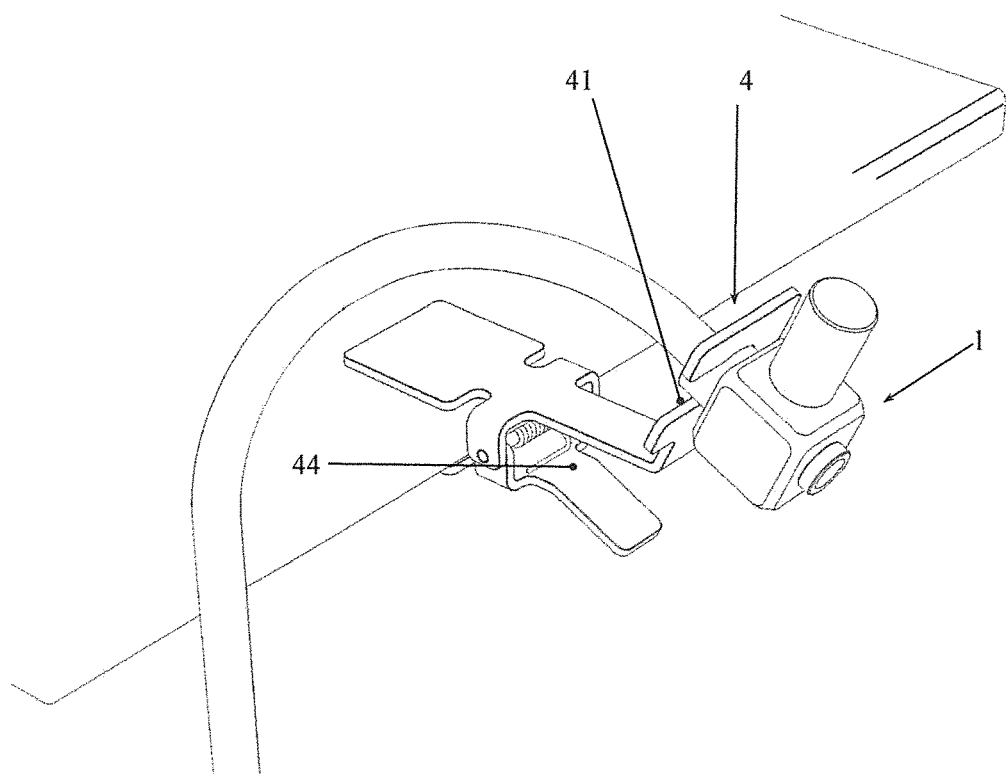
FIG. 11 shows a perspective view of another embodiment of the universal hydraulic connection system according to the present invention.
Figure 12:
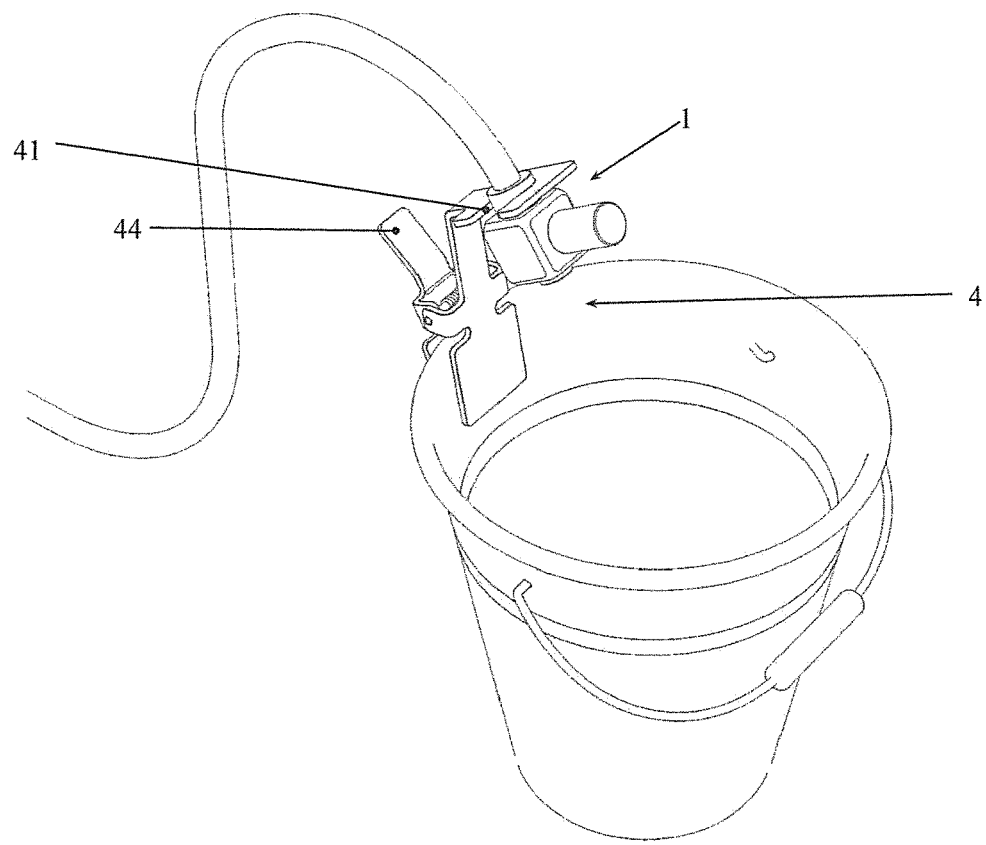
FIG. 12 shows a perspective view of another embodiment of the universal hydraulic connection system according to, the present invention.
Figure 14:
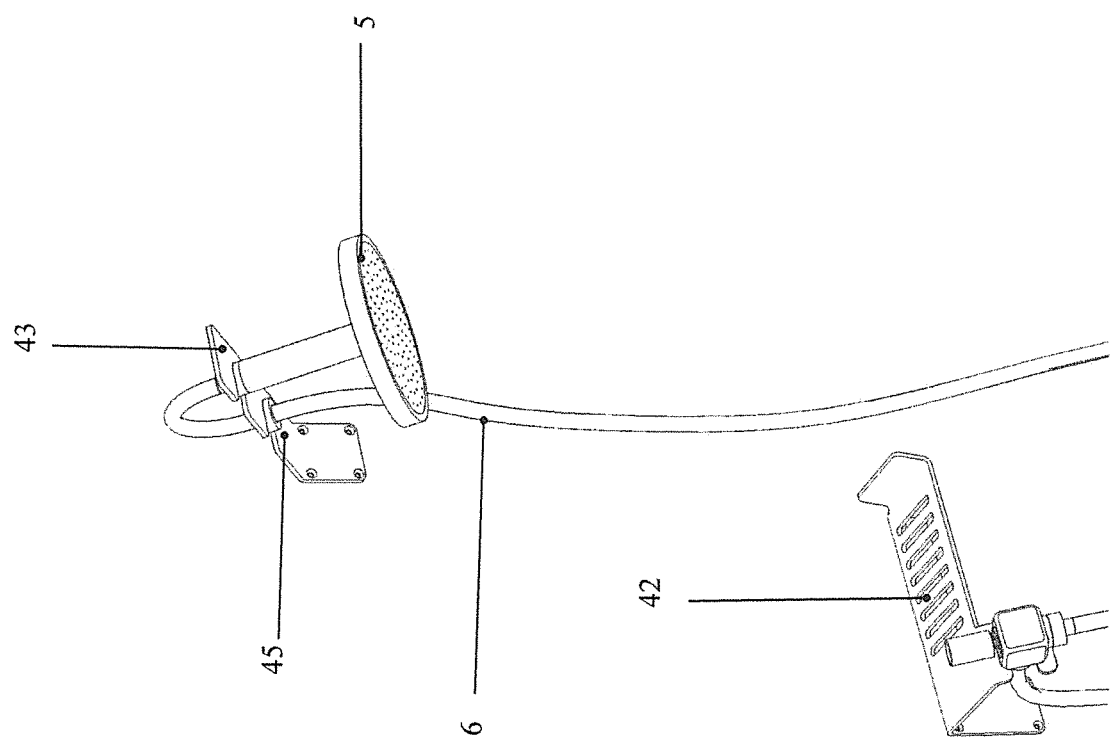
FIG. 14 shows a perspective view of another embodiment of the universal hydraulic connection system according to the present invention.
Figure 13:
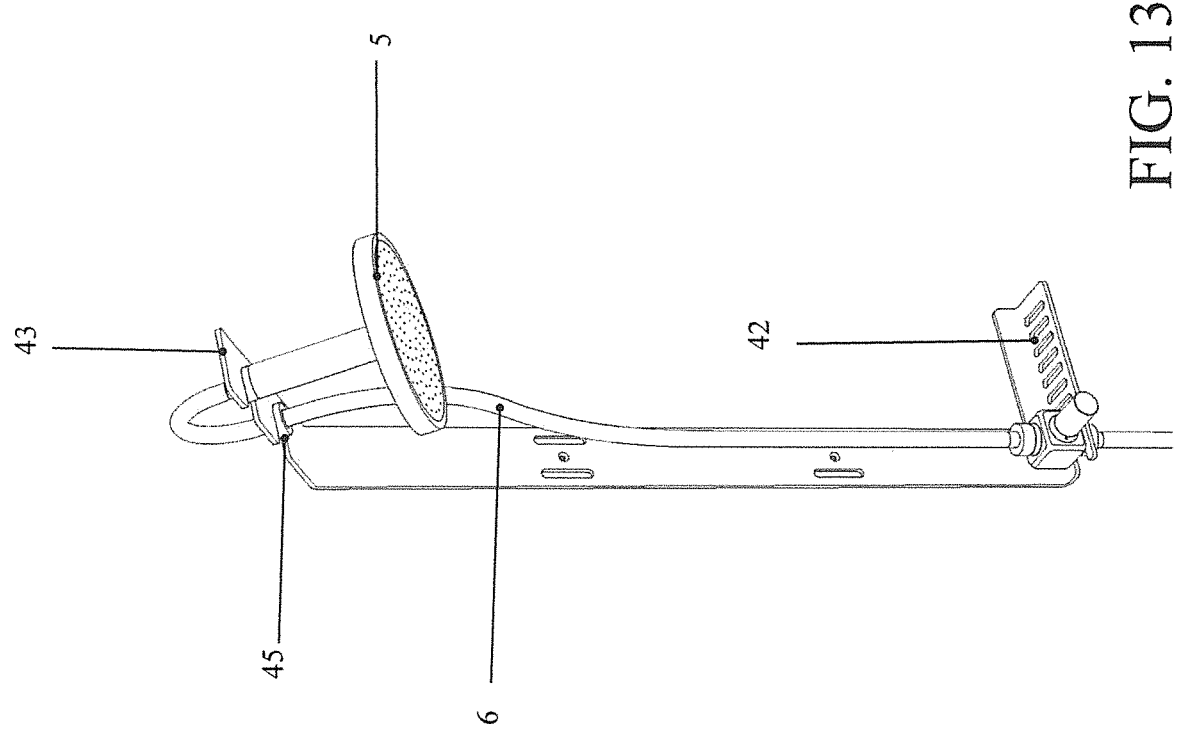
FIG. 13 shows a perspective view of another embodiment of the universal hydraulic connection system according to the present invention.
Figure 15:
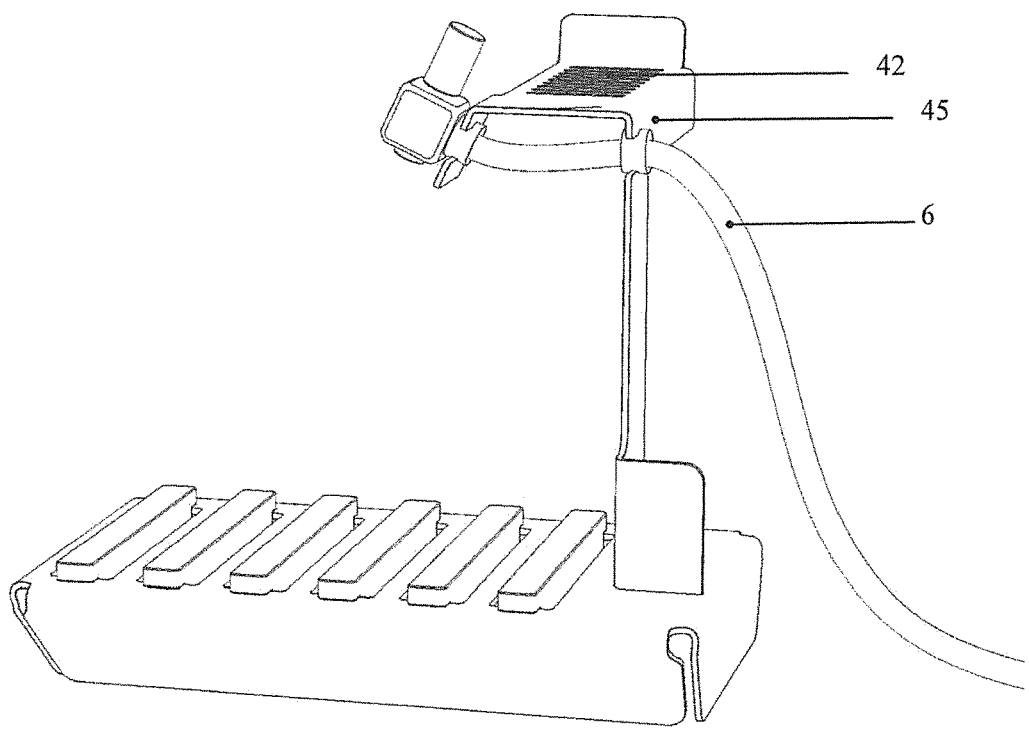
FIG. 15 shows a perspective view of a combination of previous embodiments of the universal hydraulic connection system according to the present invention.
Figure 16:
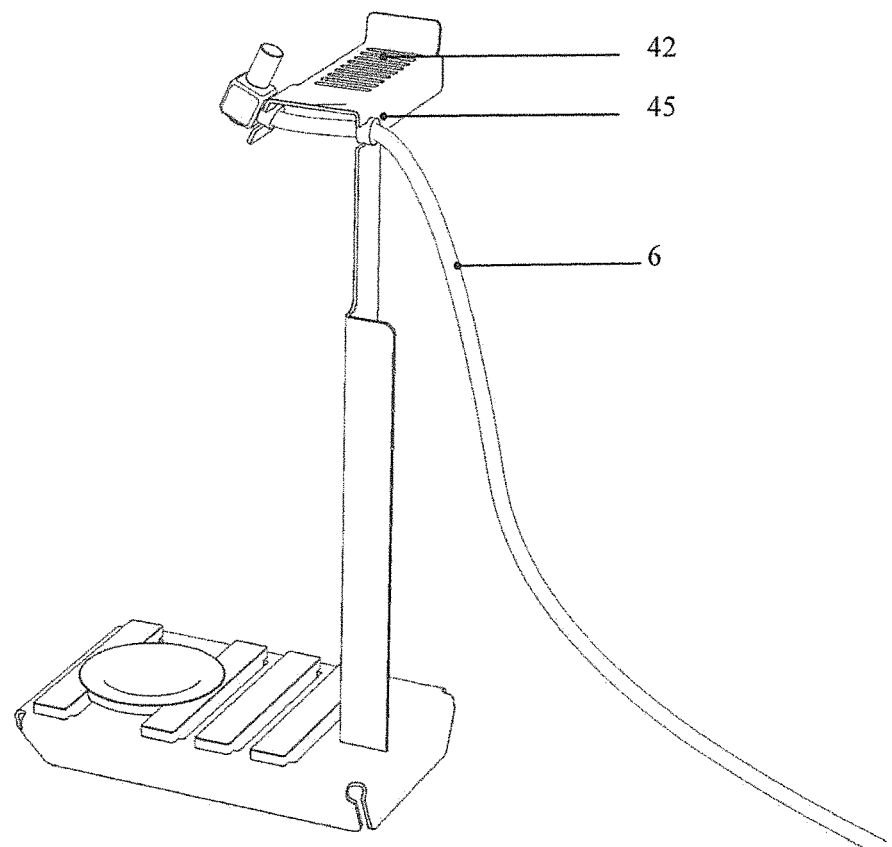
FIG. 16 shows a perspective view of another combination of previous embodiments of the universal hydraulic connection system according to the present invention.
Figure 17:
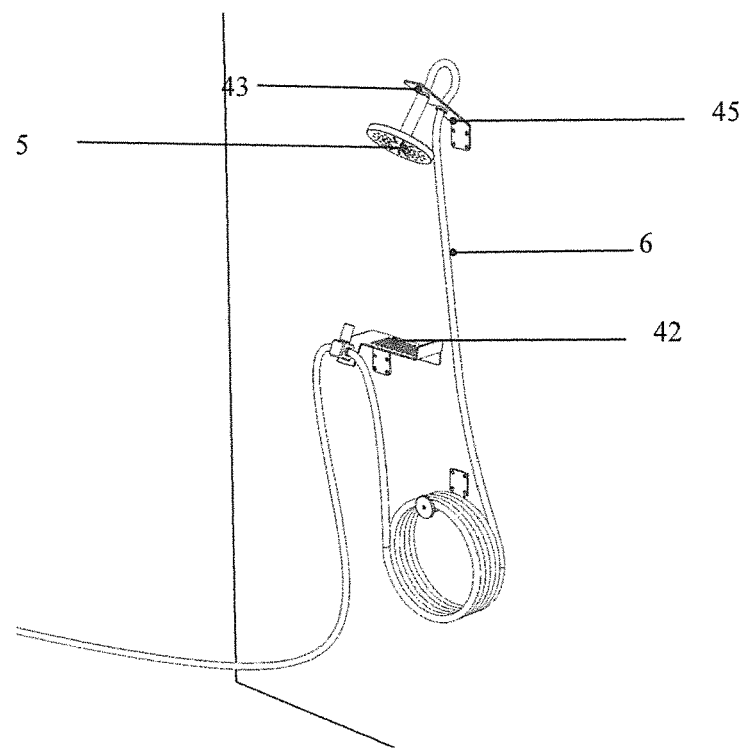
FIG. 17 shows a perspective view of another combination of previous embodiments of the universal hydraulic connection system according to the present invention.
Figure 18:
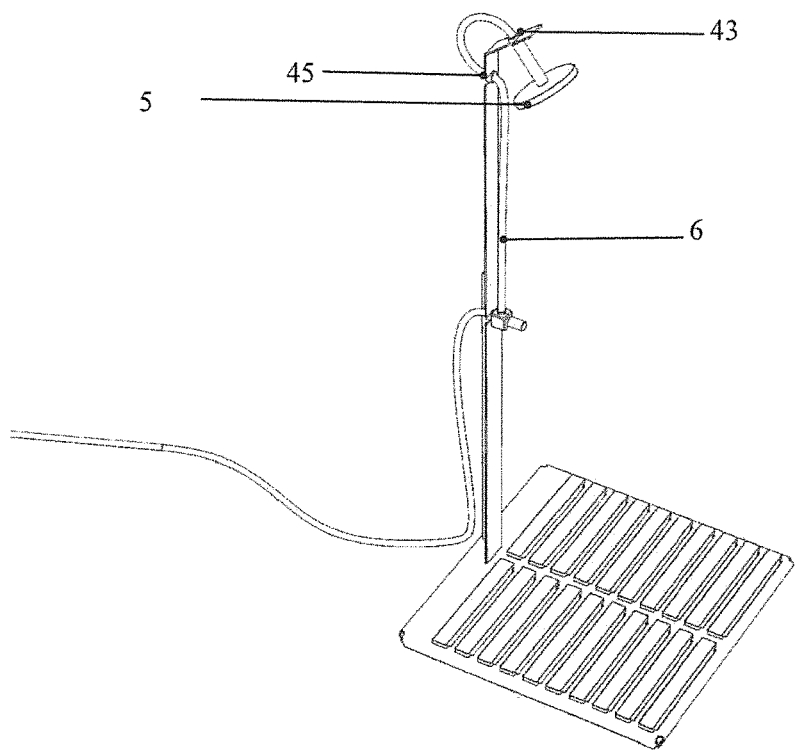
FIG. 18 shows a perspective view of another combination of previous embodiments of the universal hydraulic connection system according to the present invention.
Figure 19:
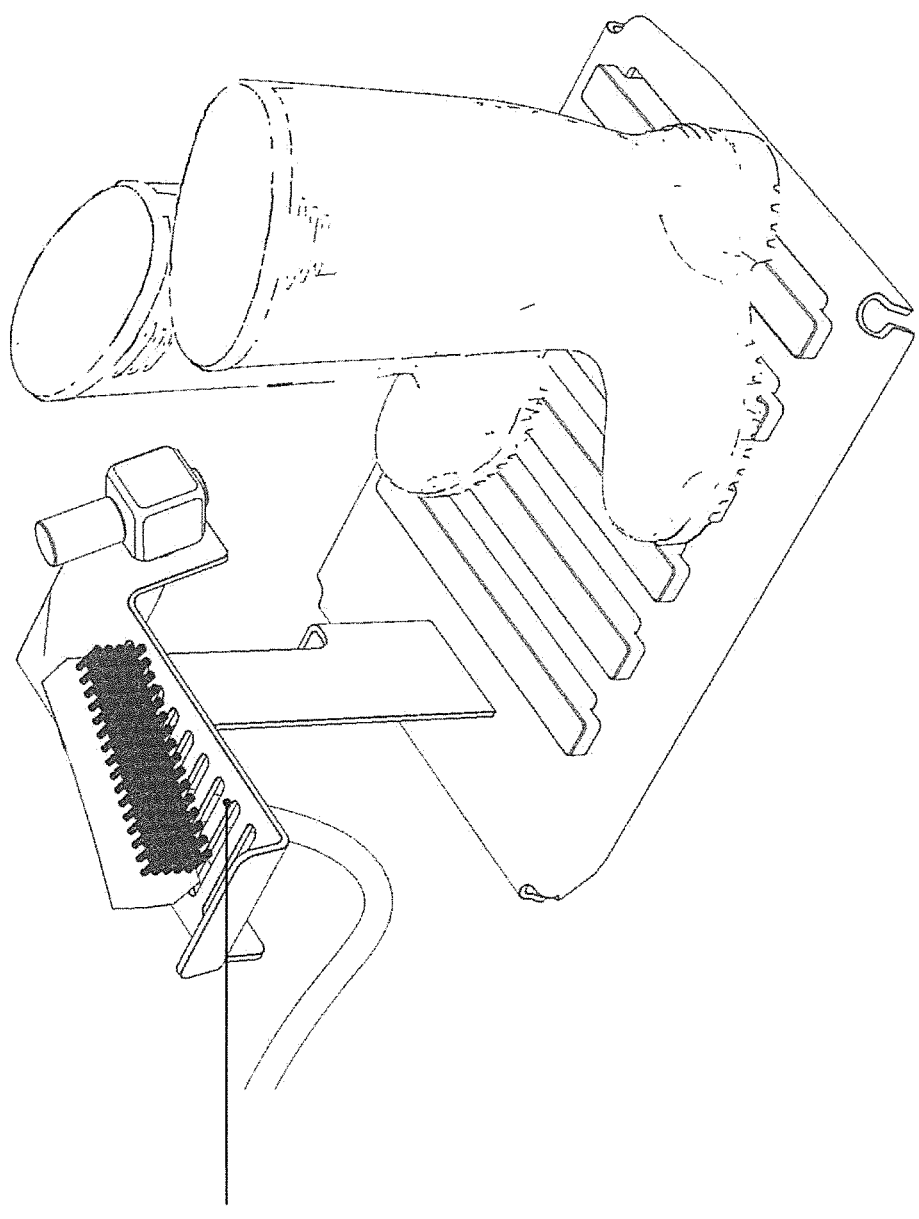
FIG. 19 shows a perspective view of another combination previous embodiments of the universal hydraulic connection system according to the present invention.
Figure 20:
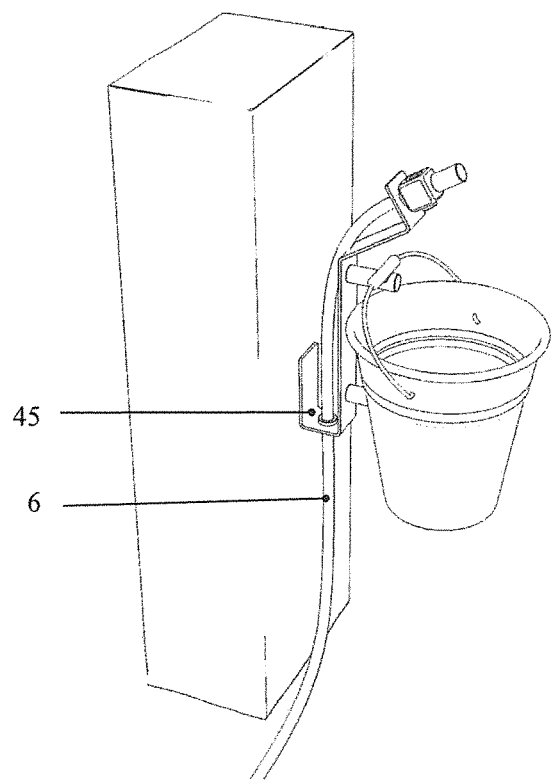
FIG. 20 shows a perspective view of another combination of previous embodiments of the universal hydraulic connection system according to the present invention.
Figure 21:
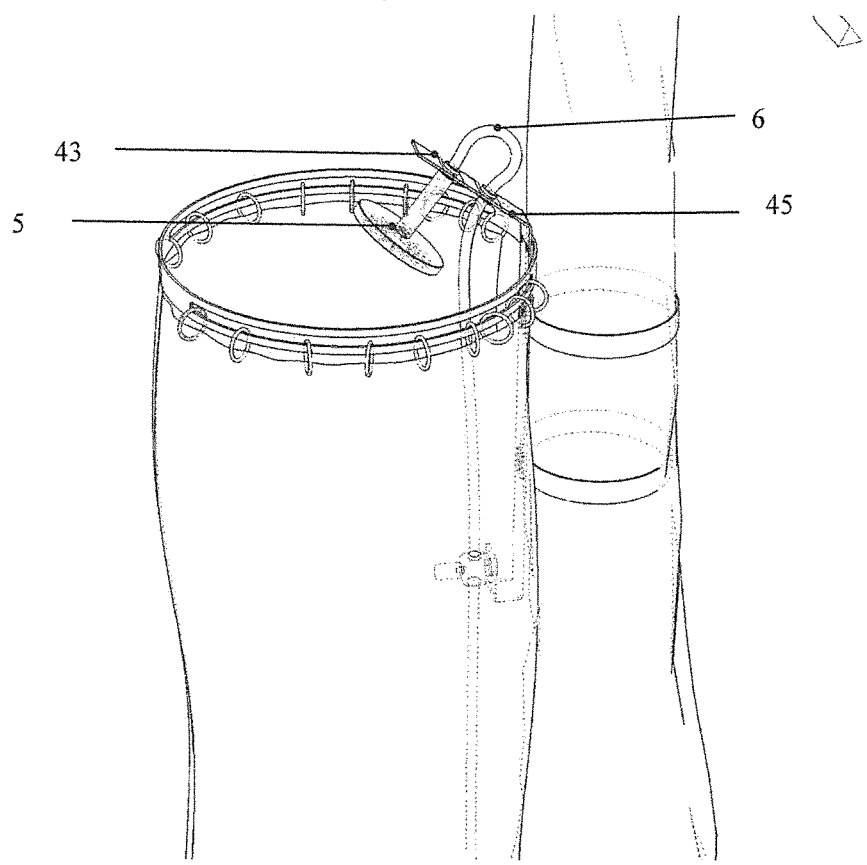
FIG. 21 shows a perspective view of another combination of previous embodiments of the universal hydraulic connection system according to the present invention.

With reference to FIGS. 11 and 12, it is possible to note that the supporting device 4 can further comprise at least one spring-type claw 44 to allow supporting and blocking the control mixer 1, by means of any hold which can be reached by the spring-type claw 44 itself.

With reference to FIGS. 13 to 21, it is possible to note that the supporting device 4 can comprise at least one fastening flange 45 adapted to support at least one hydraulic pipe 6.

Figure 22:
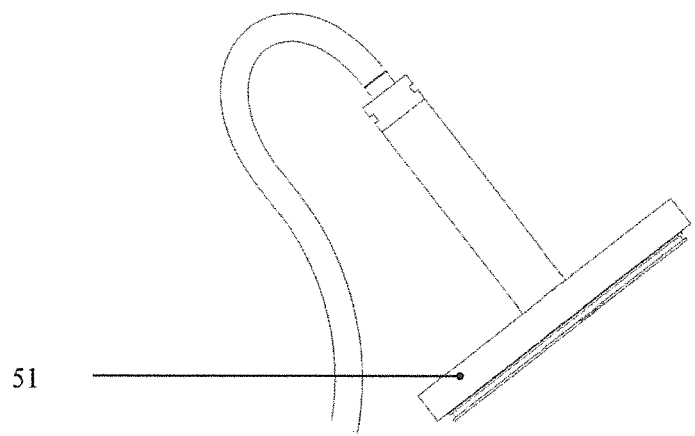
FIG. 22 shows an interchangeable connection user of the universal hydraulic connection system according to the present invention
Figure 23:
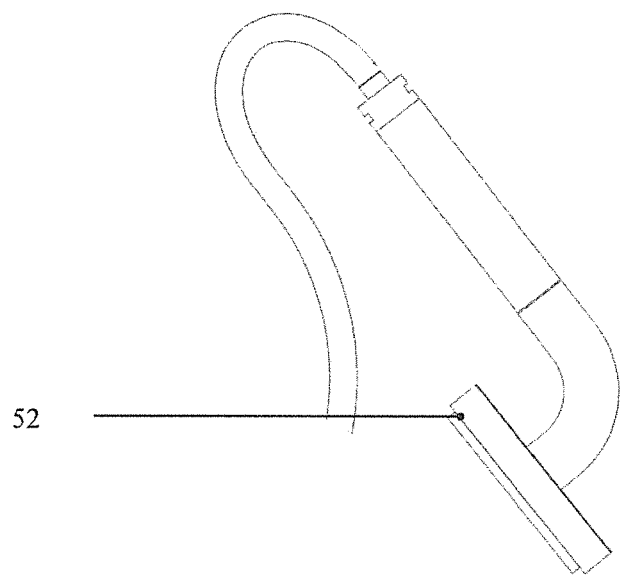
FIG. 23 shows another interchangeable connection user of the universal hydraulic connection system according to the present invention.
Figure 24:
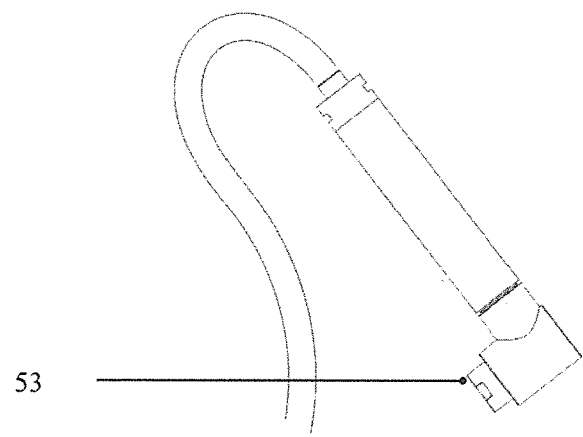
FIG. 24 shows another interchangeable connection user of the universal hydraulic connection system according to the present invention.

With reference to FIGS. 22 to 24, it is possible to note that the tap 5 can be composed of a water delivering element 51, 52, 53 of an interchangeable type with respect to the control mixer 1.

From the construction point of view, the supporting device 4 can be of the type obtained from shaped and bent sheets.

The universal hydraulic connection system of the present invention as described above thereby allows obtaining the stated objects.

In particular, the control mixer 1 connected to a hydraulic network through interchangeable inlet and outlet connectors can also be removably connected to the supporting device. In this way, also the mixer, as already used for taps, can assume a standardized shape which can be easily applied in any point of the hydraulic network. The chance of using a single type of mixer allows greatly reducing the production costs, due to the management of a reduced number of die-casting dies, for example.

A removable connection of the mixer with respect to a hydraulic network allows defining several types of use as explained in the description of the present invention.

In fact, the supporting device adapted to removably connect the mixer to the hydraulic network is adapted to perform several additional functions, under several combinations.

In particular, such supporting device can comprise one or more of the following elements a shelf for resting objects thereon;

a connection flange of at least one tap;

a fastening flange of sections of hydraulic pipe;

a spring-type claw to allow blocking the mixer in different environments.

The universal hydraulic connection system of the present invention further allows making a supporting device with a pleasant, in addition to functional design.

The invention claimed is:

1. A universal hydraulic connection system comprising:
a control mixer connected to a hydraulic network through an interchangeable inlet connector and an interchangeable outlet connector and to a support, and
a quick connection device adapted to allow movably connecting the control mixer to the support keeping the hydraulic connection of the control mixer with respect to an hydraulic network, wherein the quick connection device is composed of:
a first grooved profile of the interchangeable inlet connector,
a second grooved profile of the interchangeable outlet connector, and
a shaped guide of the support to allow sliding and blocking the control mixer with respect to the support, the shaped guide being adapted to house therein either the first grooved profile of the interchangeable inlet connector or the second grooved profile of the interchangeable outlet connector.

2. The universal hydraulic connection system of claim 1, wherein the support comprises a shelf adapted to allow resting objects thereon.

3. The universal hydraulic connection system of claim 1, wherein the support comprises a flange adapted to allow supporting a tap hydraulically connected to the control mixer.

4. The universal hydraulic connection system of claim 1, wherein the support comprises a spring-type claw adapted to allow blocking the control mixer by means of a hold which can be reached by the spring-type claw.

5. The universal hydraulic connection system of claim 1, wherein the support comprises a fastening flange adapted to allow supporting a hydraulic pipe.

\* \* \* \* \*